US010962028B2

(12) United States Patent
Walsh et al.

(10) Patent No.: US 10,962,028 B2
(45) Date of Patent: Mar. 30, 2021

(54) ADDITIVELY MANUFACTURED EJECTOR PUMP

(71) Applicant: Hamilton Sundstrand Corporation, Charlotte, NC (US)

(72) Inventors: Kevin P. Walsh, Enfield, CT (US); Harold R. Mahoney, Holyoke, MA (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 253 days.

(21) Appl. No.: 15/863,561

(22) Filed: Jan. 5, 2018

(65) Prior Publication Data
US 2019/0211847 A1  Jul. 11, 2019

(51) Int. Cl.
*F04F 5/46* (2006.01)
*B33Y 10/00* (2015.01)
*B33Y 80/00* (2015.01)
*B22F 10/00* (2021.01)
*F04F 99/00* (2009.01)

(52) U.S. Cl.
CPC ............... *F04F 5/46* (2013.01); *B22F 10/00* (2021.01); *B33Y 10/00* (2014.12); *B33Y 80/00* (2014.12); *F04F 5/466* (2013.01); *F04F 99/00* (2013.01)

(58) Field of Classification Search
CPC .......... B33Y 10/00; B33Y 80/00; F04F 5/466; F04F 5/46; F04F 99/00; B23P 15/00; B22F 10/00
USPC ................................................ 417/179, 198
See application file for complete search history.

(56) References Cited

U.S. PATENT DOCUMENTS

| 1,543,834 | A | * | 6/1925 | Ehrhart | F04F 5/42 417/161 |
| 1,574,677 | A | * | 2/1926 | Mulder | F04F 5/461 417/177 |
| 1,648,238 | A | * | 11/1927 | Modra | F04F 5/464 417/183 |
| 1,671,851 | A | * | 5/1928 | Brown | F04F 5/466 417/191 |
| 1,724,625 | A | * | 8/1929 | Sweeny | A47L 5/18 417/183 |

(Continued)

FOREIGN PATENT DOCUMENTS

| DE | 954545 C | 12/1956 |
| JP | 04184000 A * | 6/1992 |
| WO | WO2017008163 A1 | 1/2017 |

OTHER PUBLICATIONS https://www.livescience.com/38862-selective-laser-sintering.html; Elizabeth Palermo; Aug. 13, 2013; LiveScience; p. 2 (Year: 2013).*

(Continued)

*Primary Examiner* — Alexander B Comley
(74) *Attorney, Agent, or Firm* — Kinney & Lange, P.A.

(57) ABSTRACT

A method of making an additively manufactured ejector pump includes creating a computer file defining the ejector pump in layers. The ejector pump includes a duct extending along a centerline from an upstream end to a downstream end, a nozzle extending inward from the duct including a flowpath, an annulus connected to the duct including a cavity. The method also includes building the ejector pump using an additive manufacturing process that builds the ejector on a layer-by-layer basis from the upstream end to the downstream end.

6 Claims, 6 Drawing Sheets

(56) References Cited

U.S. PATENT DOCUMENTS

| | | | | | |
|---|---|---|---|---|---|
| 2,061,032 | A | * | 11/1936 | Huff | F04F 5/46 417/198 |
| 2,111,266 | A | * | 3/1938 | Hopkins | F24F 13/26 417/179 |
| 2,172,522 | A | * | 9/1939 | Sline | F01M 13/04 123/41.86 |
| 3,188,009 | A | * | 6/1965 | Miscovich | B05B 1/1645 239/407 |
| 3,460,747 | A | * | 8/1969 | Forsythe | F04F 5/466 417/189 |
| 3,468,472 | A | * | 9/1969 | Hahn | F04F 5/466 417/191 |
| 3,554,450 | A | * | 1/1971 | D'Muhala | B05B 7/2454 239/309 |
| 4,400,138 | A | * | 8/1983 | Baer | B01F 5/0471 29/450 |
| 4,815,942 | A | * | 3/1989 | Alperin | F04F 5/467 417/163 |
| 5,417,550 | A | * | 5/1995 | Kasai | C02F 7/00 366/173.1 |
| 5,510,066 | A | * | 4/1996 | Fink | B29C 64/40 264/40.1 |
| 5,904,890 | A | * | 5/1999 | Lohner | B33Y 10/00 264/401 |
| 2013/0167566 | A1 | | 7/2013 | Alahyari | |
| 2015/0004008 | A1 | * | 1/2015 | Palmisano | B63B 13/00 417/179 |
| 2015/0071809 | A1 | * | 3/2015 | Nordkvist | B28B 1/001 419/23 |
| 2015/0367415 | A1 | * | 12/2015 | Buller | B23K 26/123 419/53 |
| 2016/0102682 | A1 | * | 4/2016 | Gass | F04F 5/20 417/179 |
| 2017/0014906 | A1 | * | 1/2017 | Ng | B23K 26/703 |
| 2017/0248160 | A1 | * | 8/2017 | Chaudhry | F04F 5/463 |
| 2018/0202466 | A1 | * | 7/2018 | Haynes | F04F 5/14 |

OTHER PUBLICATIONS

Thepa, Sirichai; Numerical Investigation of the Influences of Nozzle Convergence Angle on the Water Ejector Efficiency; KKU Engineering Journal (Year: 2016).*
Extended European Search Report from EP Application Serial No. 19150573.4, dated Jul. 30, 2019, 11 pages.
Partial European Search Report from EP Application Serial No. 19150573.4, dated Apr. 29, 2019, 15 pages.
"3d Printing Overhangs and Bridges", from <http://www.3dpringingera.com/3d-printing-overhangs-and-bridges/>, Mar. 7, 2013, 2 pages.
T. S. Srivatsan et al., "Additive Manufacturing of Materials", from <http://ebookcentral.proquest.com>, Sep. 25, 2015, pp. 1-48.
M. P. Zwier et al., "Design for Additive Manufacturing: Automated Build Orientation Selection and Optimization", from Procedia CIRP 55, 2016, pp. 128-133.
Communication Pursuant to Article 94(3) EPC for EP Application Serial No. 19150573.4, dated Oct. 19, 2020, 7 pages.

* cited by examiner

ADDITIVELY MANUFACTURED EJECTOR PUMP

BACKGROUND

The present invention relates generally to ejector pumps, and more particularly to an ejector made by additive manufacturing.

Ejector pumps use the pressure energy from a high pressure source to increase the pressure and flow of a low pressure source. The high pressure source is directed through an ejector having nozzles which convert pressure energy to kinetic energy, and this high velocity flow entrains fluid from the low pressure source. The two streams experience pressure equalization and mixing downstream of the ejector leading to pressure recovery. Ejector pumps are beneficial because they have no moving parts and are relatively inexpensive and reliable, especially when a high pressure source is readily available. Conventional ejector pumps are fabricated either by machining and welding or by casting. Conventional manufacturing methods can be expensive, and it can be time consuming to change the tooling if a change is implemented to the design of the ejector pump.

SUMMARY

According to one embodiment, a method of making an additively manufactured ejector pump includes creating a computer file defining the ejector pump in layers. The ejector pump includes a duct extending along a centerline from an upstream end to a downstream end, a nozzle extending inward from the duct including a flow path, an annulus connected to the duct including a cavity. The method also includes building the ejector pump using an additive manufacturing process that builds the ejector on a layer-by-layer basis from the upstream end to the downstream end.

According to another embodiment, a monolithic ejector pump has an upstream end and a downstream end, the ejector pump including a duct extending along a centerline from an upstream end to a downstream end, a nozzle extending inward from the duct including a flow path, and an annulus connected to the duct including a cavity. The ejector pump is made by the steps of: selectively sintering a first layer of pulverulent material within a frame to make an initial layer of the upstream end of a partially built ejector pump, lowering the partially built ejector pump, adding a second layer of pulverulent material on top of the partially built ejector pump, and selectively sintering the second layer of pulverulent material to the partially built ejector pump.

According to another embodiment, an ejector pump includes a duct extending along a centerline from an upstream end to a downstream end, a nozzle extending inward from the duct including a flow path therein, an annulus connected to the duct including a cavity therein. The ejector pump further includes at least one of the group consisting of: a first gusset extending between the duct and the nozzle on a nozzle downstream side; wherein the flow path comprises a cross-section with a flow path shape of a semicircle on a nozzle upstream side and a peaked shape on the nozzle downstream side; and wherein the cavity comprises a cross-section with a cavity shape of quadrant of a circle on an annulus upstream side and a slant on an annulus downstream side.

DETAILED DESCRIPTION

Figure 1:
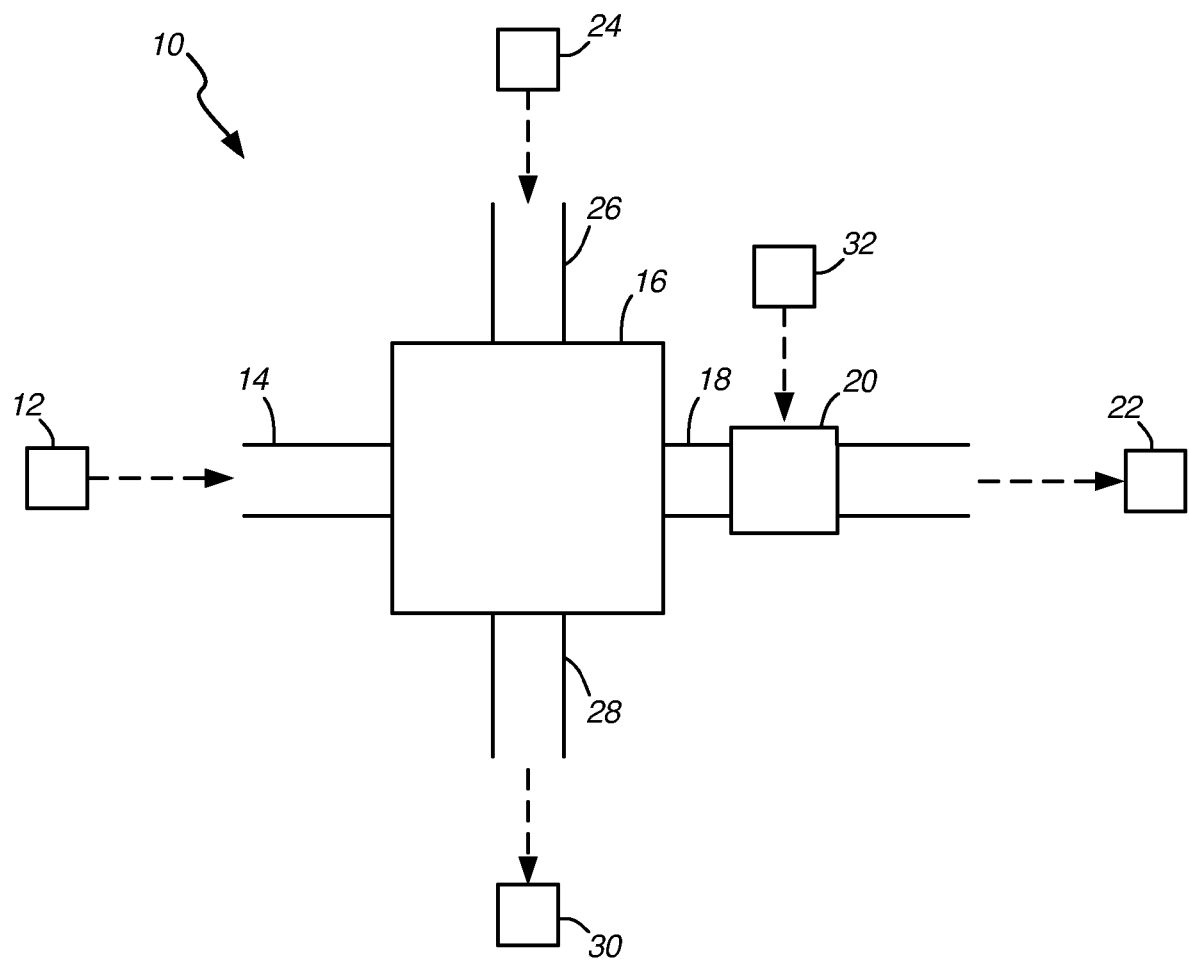
FIG. 1 is a schematic view of a heat exchanger system with an additively manufactured ejector pump.

Shown in FIG. 1 is a schematic view of heat exchanger system 10 which includes first source 12, first inlet 14, heat exchanger 16, first outlet 18, ejector pump 20, and first destination 22 as the first fluid pathway. Heat exchanger system 10 also includes second source 24, second inlet 26, heat exchanger 16 (again), second outlet 28, and second destination 30 as the second fluid pathway. In the illustrated embodiment, heat exchanger 16 is configured in a conventional manner that separates the two fluids (not shown) but encourages the transfer of heat therebetween.

Heat exchanger system 10 further includes high-pressure source 32 which is connected to ejector pump 20. In order to pump fluid from first source 12 through heat exchanger 16, fluid is released from high-pressure source 32 into ejector pump 20. As described in the Background section above, this fluid draws fluid from first source 12 and both fluids flow to first destination 22. In the illustrated embodiment, only the first fluid pathway includes an ejector pump 20, so fluid is pumped through the second pathway by some other conventional means (not shown). In an alternate embodiment, another ejector pump 20 (not shown) can be installed in the second fluid pathway to pump fluid from second source 24 through heat exchanger 16. This ejector pump 20 can receive fluid from high-pressure source 32, or it can have its own high-pressure source (not shown).

Figure 2A:
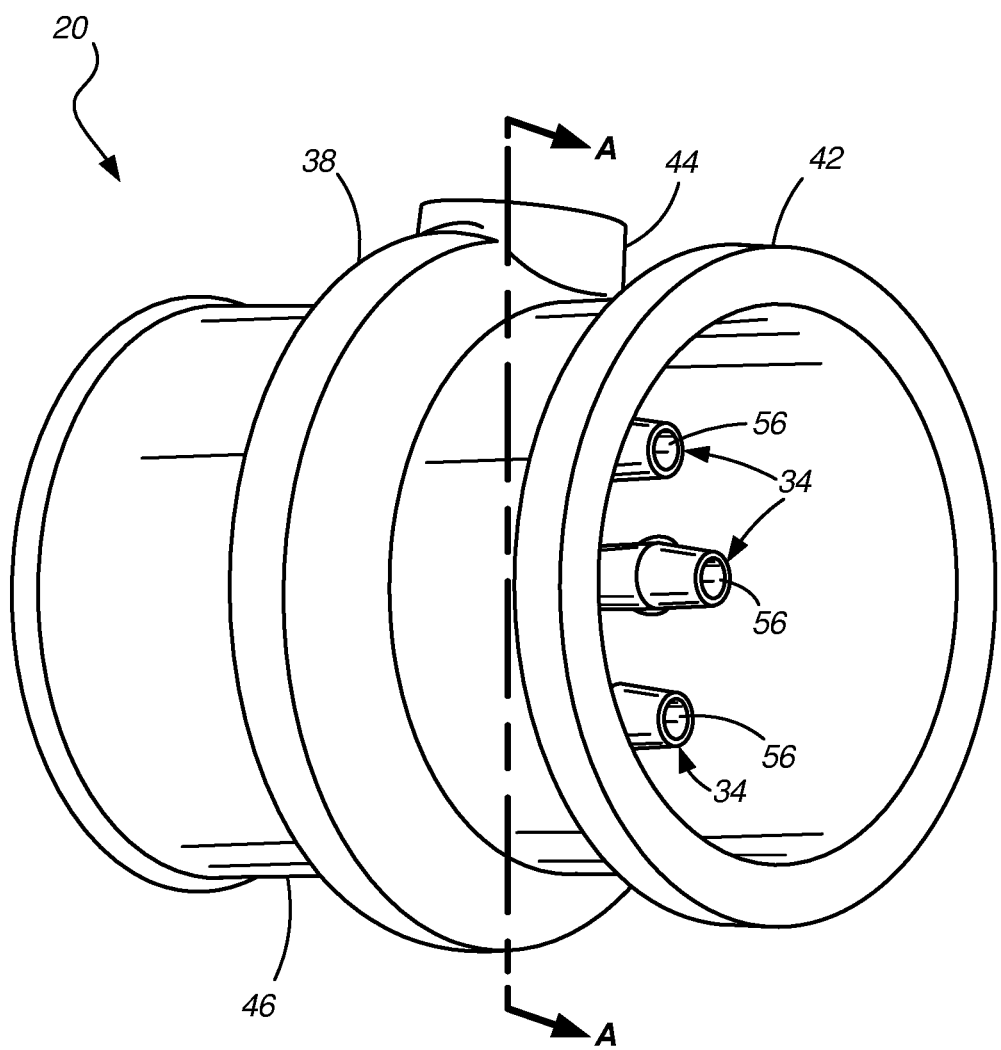
FIG. 2A is a perspective view of the ejector pump of FIG. 1.
Figure 2B:
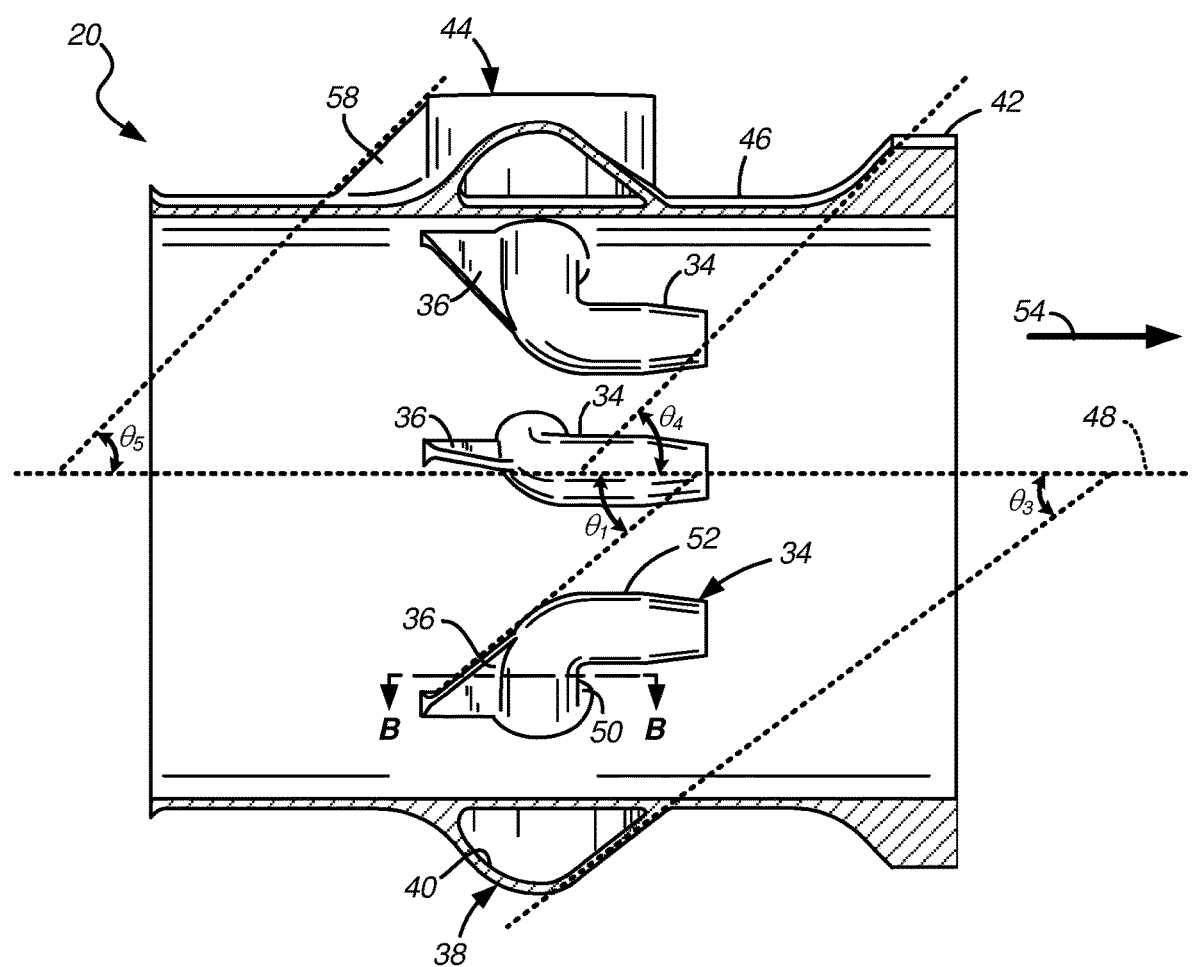
FIG. 2B is a cross-sectional view of the ejector pump of FIG. 1 along line A-A in FIG. 2A.
Figure 2C:
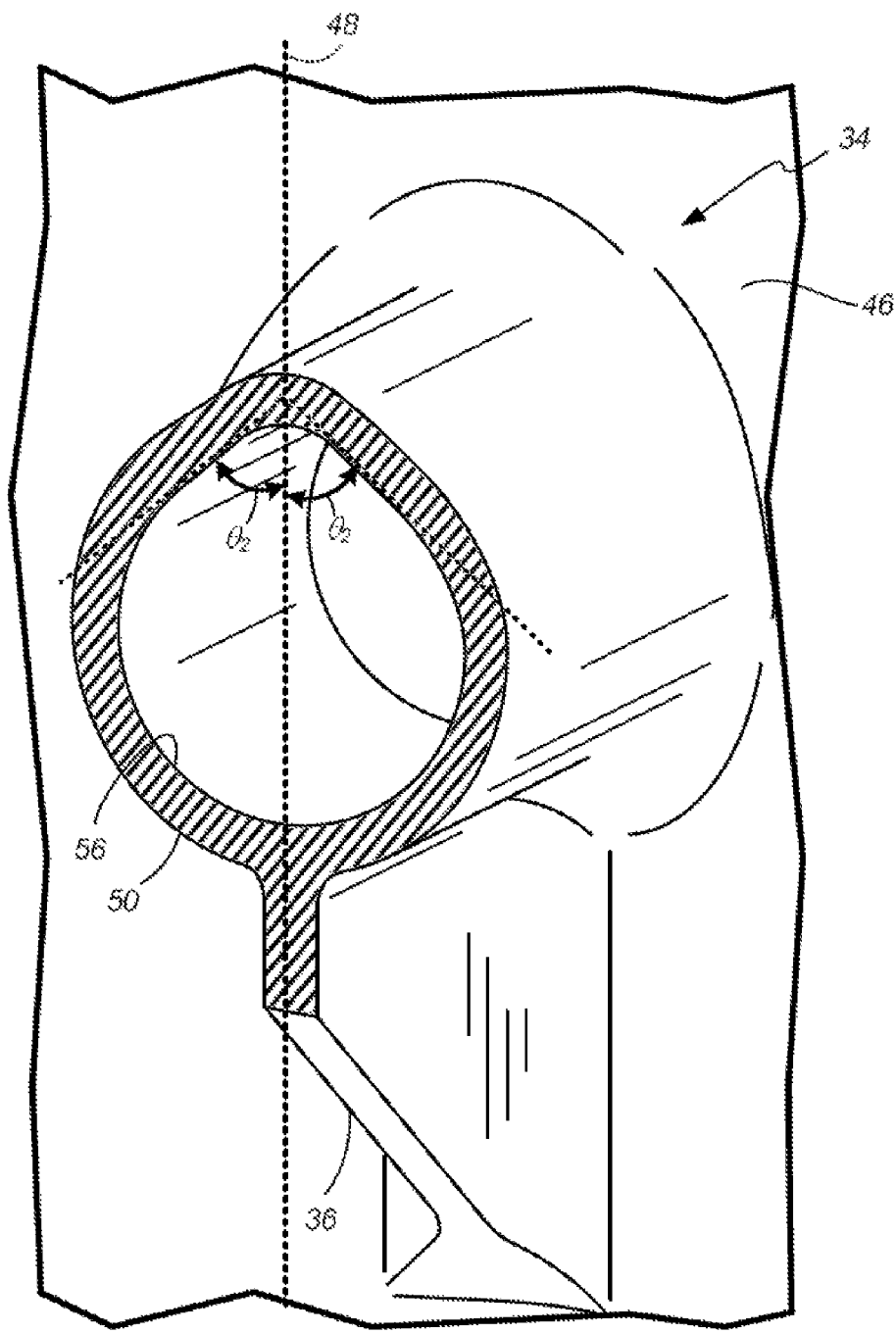
FIG. 2C is an enlarged cross-sectional view of the ejector pump of FIG. 2B along line B-B in FIG. 2B.

Shown in FIG. 2A is a perspective view of ejector pump 20. Shown in FIG. 2B is a cross-sectional view of ejector pump 20 along line A-A in FIG. 2A. Shown in FIG. 2C is an enlarged cross-sectional view of ejector pump 20 along line B-B in FIG. 2B. FIGS. 2A-2C will now be discussed simultaneously.

In the illustrated embodiment, ejector pump 20 is a unitary, monolithic body manufactured using additive manufacturing techniques, as discussed later with respect to FIGS. 3 and 4. Ejector pump 20 is comprised of a single material or alloy with several integral structures, such nozzles 34 with gussets 36, annulus 38 with cavity 40, flange 42, and platform 44.

In the illustrated embodiment, ejector pump 20 comprises duct 46 which extends along centerline 48. A plurality of nozzles 34 extend inward from the interior of duct 46. Initial portion 50 of each nozzle 34 extends towards centerline 48, perpendicular to duct 46; and exit portion 52 of each nozzle 34 extends towards the downstream end of duct 46, parallel to centerline 48. The flow direction is denoted by arrow 54, which is also the direction in which ejector pump 20 is grown during manufacturing (as discussed below with respect to FIGS. 3 and 4). In order to support each nozzle 34 during manufacturing, a gusset 36 connects the upstream side of initial portion 50 with the interior of duct 46 at an angle $\theta_1$ of fifty degrees or less with respect to centerline 48. Gussets 36 are aligned parallel to centerline 48 as to not impede the flow of the fluid from heat exchanger 16 (shown in FIG. 1). There is only one gusset 36 connected to each nozzle 34, although in alternate embodiments, there can be additional gussets 36 attached to each nozzle 34.

In addition, each nozzle 34 includes flow path 56 which is a hollow space through which the high-pressure fluid flows (as discussed above with respect to FIG. 1). The cross-sectional shape of flow path 56 in exit portion 52 is circular, but the cross-sectional shape of flow path 56 in initial portion 50 is semicircular on the upstream side and peaked on the downstream side. Each leg of the peaked side extends at angle $\theta_2$ of about fifty degrees or less with respect to centerline 48 and has a fillet joining the two legs at the downstream end. The peaked configuration allows for the peaked side of initial portion 50 to be grown by additive manufacturing without additional support structures, be they temporary or permanent.

In the illustrated embodiment, each flow path 56 extends through duct 46 and is fluidly connected to cavity 40. Cavity 40 is a hollow space in annulus 38 through which the high-pressure fluid flows (as discussed above with respect to FIG. 1), allowing the high-pressure fluid to be distributed to all of the nozzles 34. Cavity 40 has a shape that is flat alongside duct 46 on the inner side with a compound shape on the outer side. The outer side is a quadrant of a circle on the upstream side and slanted toward duct 46 on the downstream side, with two interior fillets where annulus 38 meets duct 46. As with initial portion 50, the slanted side has angle $\theta_3$ of about fifty degrees or less with respect to centerline 48 so that annulus 38 can be grown by additive manufacturing without additional internal support structures. In addition, the exterior of annulus 38 has a fillet on the upstream side where annulus 38 connects to the exterior of duct 46, then annulus 38 has a shape that is offset from the shape of cavity 40 (i.e., circular on the upstream side and linear on the downstream side), and annulus 38 terminates with another fillet where annulus 38 connects to duct 46 again.

In the illustrated embodiment, ejector pump 20 has flange 42 at the downstream end of duct 46. Flange 42 is a thickened section that can be machined and/or welded to attach ejector pump 20 to other components in heat exchanger system 10 (shown in FIG. 1). More specifically, flange 42 extends from duct 46 at angle $\theta_4$ of about fifty degrees or less with respect to centerline 48 so that flange 42 can be grown by additive manufacturing without additional support structures, be they temporary or permanent. However, flange 42 terminates abruptly with an annular surface that is perpendicular to centerline 48.

Ejector pump 20 further includes platform 44. Platform 44 extends from the exterior of duct 46 is configured to be an interface to connect ejector pump 20 with high-pressure source 32. More specifically, platform 44 has a flat outer surface that is parallel to centerline 48 and can be made solid during the additive manufacturing process. Subsequently a port can be drilled through platform 44, into cavity 40, and a fitting can be threaded into or welded onto platform 44 to connect ejector pump 20 to high-pressure source 32. The port in platform 44 allows the high-pressure fluid from high-pressure source 32 to travel into cavity 40. As with nozzles 34, platform 44 includes gusset 58 which connects the upstream side of platform 44 with the exterior of duct 46 at an angle $\theta_5$ of fifty degrees or less with respect to centerline 48. Gusset 58 supports platform 44 during manufacturing of ejector pump 20 so no additional support structures are necessary, including temporary support structures. There is only one gusset 58, although in alternate embodiments, there can be additional gussets 58 connected to platform 44.

The configuration of ejector pump 20 allows for use of an additive manufacturing process without needing temporary supporting structures to be made and without permanent supporting structures within the flow areas of the high-pressure fluid (i.e., within platform 44, cavity 40, or flow paths 56. Thereby, no post-processing steps are needed to remove temporary supports, and there are no unnecessary structures impeding the flow of the high-pressure fluid.

Figure 3:
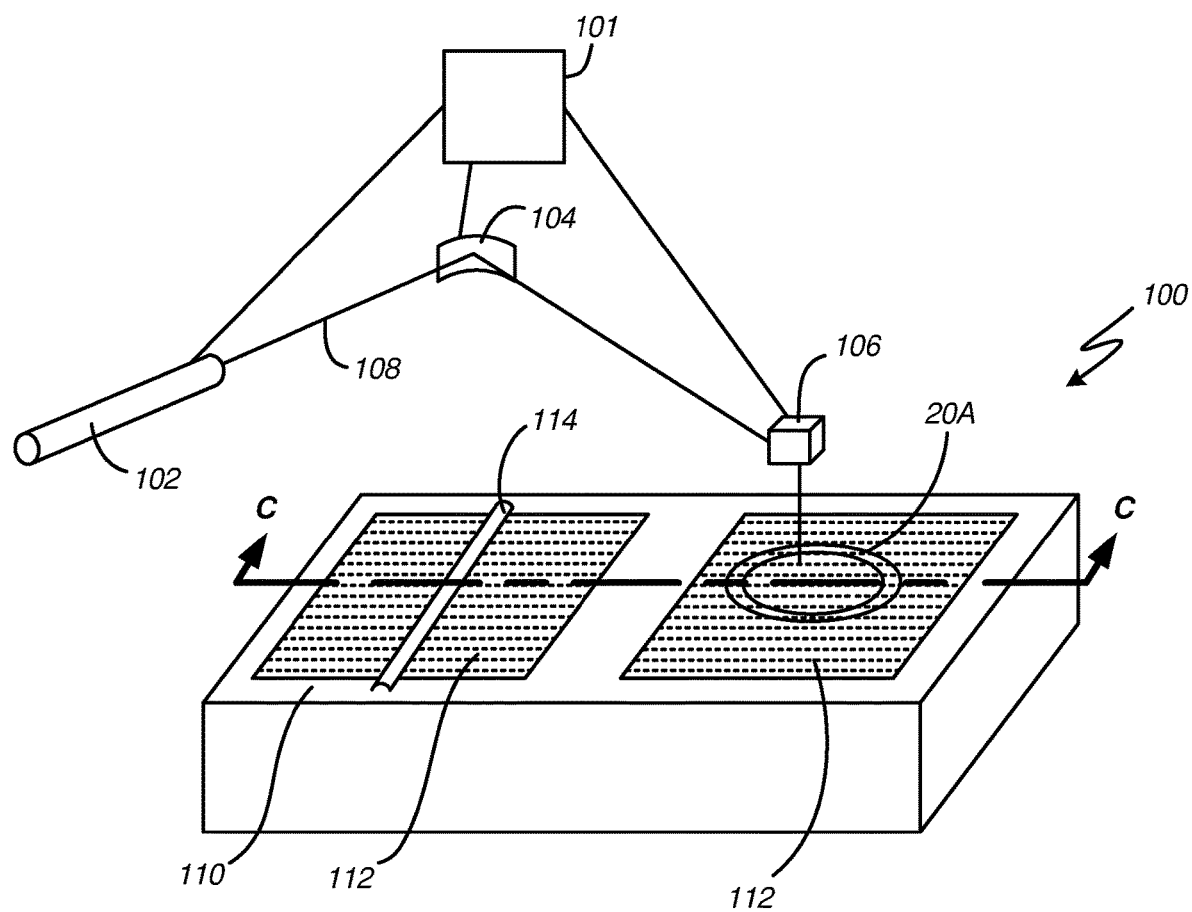
FIG. 3 is a perspective view of an additive manufacturing apparatus.

FIG. 3 is a perspective view of additive manufacturing apparatus 100. In particular, FIG. 3 shows an additive manufacturing apparatus which uses laser additive manufacturing to create a three-dimensional object out of sinterable, pulverulent material. While direct metal laser sintering (DMLS) is described, other additive manufacturing techniques may be employed, such as, for example, laser powder bed fusion, electron beam powder bed fusion, laser powder deposition, electron beam wire, selective laser sintering, or any other additive process.

Additive manufacturing apparatus 100 includes computer 101 and a set of optical components, including laser 102, mirror 104, and moving optical head 106, which guide laser beam 108 according to the instructions from computer 101. Laser 102 may be any source of heating radiation, such as a $CO_2$ laser. Additive manufacturing apparatus 100 also includes frame 110, pulverulent material 112, and coater 114, which are used for powder containment and application. Pulverulent material 112 may be any material suitable for use as an ejector. Typically, pulverulent material 112 will be one or more metal materials or alloys. For example, pulverulent material 112 may be steel, stainless steel, or a high temperature superalloy. Coater 114 is arranged along a surface of frame 110, and may be moved across the surface of frame 110. Coater 114 may be, for example, a knife blade or a roller. As shown in FIG. 3, partially built ejector pump 20A is present inside frame 110.

A user creates a computer file for computer 101 that defines a component with particular features, such as ejector pump 20 (shown in FIGS. 2A-2C), in layers (that can be of different thicknesses). Computer 101 then controls the optical equipment to create the component. Laser 102 creates laser beam 108 which can be used for melting, sintering, or cutting. Laser 102 is pointed towards mirror 104, which is arranged to deflect laser beam 108 toward moving optical head 106. Generally, moving optical head 106 directs laser beam 108 towards areas within frame 110, which holds pulverulent material 112. Generally, the areas melted or sintered form a layer of ejector pump 20. In FIG. 3, partially built ejector pump 20A is shown being built up on a layer-by-layer basis. Areas adjacent to partially built ejector pump 20A can remain unmelted or unsintered to form nozzles 34 and annulus 38 (shown in FIGS. 2B and 2C).

After each layer of partially built ejector pump 20A is finished, the support holding partially built ejector pump 20A (shown later in FIG. 4) is lowered by the thickness of one layer of pulverulent material 112, and additional pulverulent material 112 is added on top of the existing structures using coater 114. Then new layer of pulverulent material 112 is melted or sintered to the top of partially built ejector pump 20A, and the process is repeated. By repeating the process several times, a layer-by-layer object, such as a complete ejector pump 20 can be manufactured.

In order to make ejector pump 20 ready for service, there may need to be post-processing performed. For example, unsintered pulverulent material inside of the cavities (e.g., cavity 40 and flow paths 56, shown in FIGS. 2B and 2C) of ejector pump 20 may need to be removed, for example, using high-pressure gas to blow it out. For another example, nozzles 34 (shown in FIGS. 2A-2C) may need to be polished inside and/or outside with abrasive material. Alternatively, these areas of ejector pump 20 can be additively manufactured using different parameters than the bulk of ejector pump 20 to ensure a fine surface finish without extra post-processing required. However, as discussed previously, no removal of temporary support structures will be needed, at least not with respect to nozzles 34, annulus 38, flange 42, or platform 44.

Figure 4:
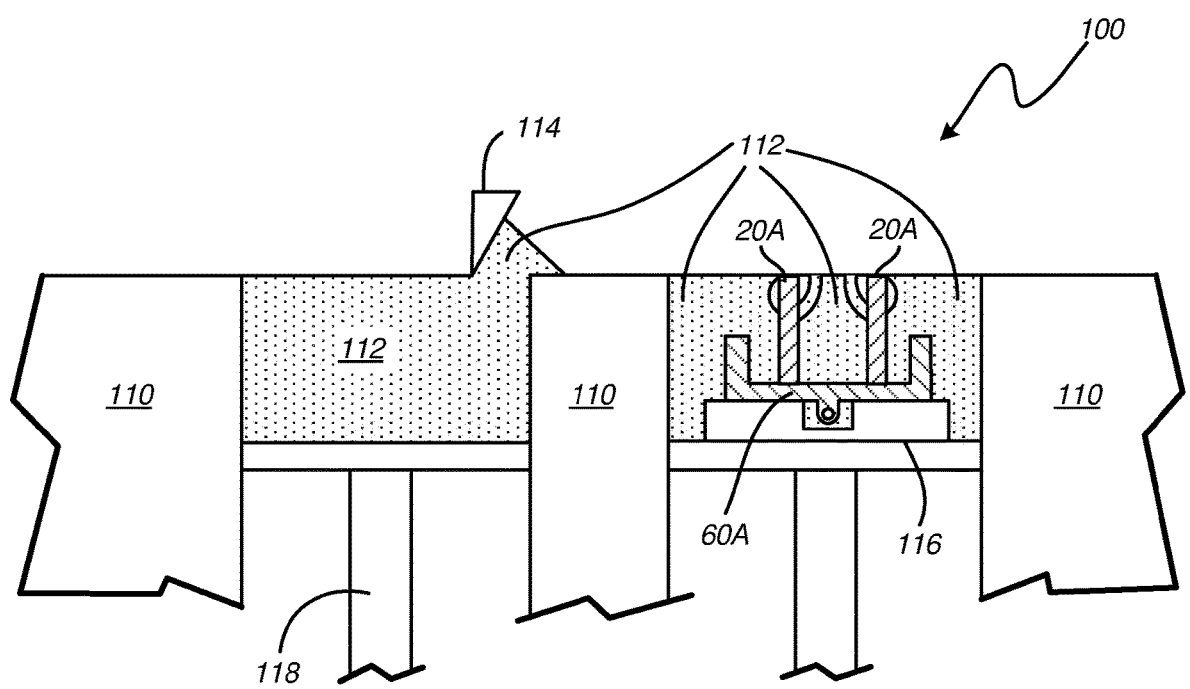
FIG. 4 is a cross section view of the additive manufacturing apparatus along line C-C in FIG. 3.

FIG. 4 is a cross section view of additive manufacturing apparatus 100 along line C-C in FIG. 3. FIG. 4 is a cutaway view that shows the operation of additive manufacturing apparatus 100. FIG. 4 shows a direct metal laser sintering (DMLS) apparatus, but it will be understood by those skilled in the art that other additive manufacturing techniques and apparatuses may be used, such as, for example, laser powder bed fusion, electron beam powder bed fusion, laser powder deposition, electron beam wire, selective laser sintering, or any other additive process.

Additive manufacturing apparatus 100 as shown in FIG. 4 includes many of the same parts as those shown in FIG. 3, such as frame 110, pulverulent material 112, coater 114, and partially built ejector pump 20A. FIG. 4 also shows component support plate 116 and material supply support 118. Component support plate 116 may be used to raise or lower partially built ejector pump 20A. Material supply support 118 may be raised to elevate or lower pulverulent material 112 above the working surface of frame 110.

FIG. 4 shows the arrangement of component support plate 116 and material supply support 118 in addition to the arrangement of parts shown in FIG. 3. As can be seen in FIG. 4, partially built ejector pump 20A rests on component support plate 116. Likewise, pulverulent material 112 rests on material supply support 118.

As each layer of partially built ejector pump 20A is melted or sintered, component support plate 116 is lowered and material supply support 118 is raised. Coater 114 scrapes a layer of pulverulent material 112 off of the top of the supply side and applies it in a layer across the top of partially built ejector pump 20A. The process is then repeated until ejector pump 20 (shown in FIGS. 2A-2C) is complete.

FIGS. 3-4 show one possible way of additively manufacturing ejector pump 20 as disclosed above in reference to FIGS. 2A-2C. Alternative methods for additively manufacturing components are possible. For example, laser powder bed fusion, electron beam powder bed fusion, laser powder deposition, electron beam wire, or selective laser sintering may be used to create objects in an additive fashion.

It should be recognized that the present invention provides numerous benefits and advantages. For example, an additively manufactured ejector pump is faster to manufacture because there is no special tooling required. Similarly, if a design change needs to be made, that can be done simply and quickly. For another example, an ejector pump can be made with minimal post-processing requirements due to the lack of temporary support structures that would have otherwise needed to be added in order to employ an additive manufacturing process. Similarly, an ejector pump can be made using additive manufacturing while avoiding the addition of support structures that would be difficult or impossible to remove during post-processing.

DISCUSSION OF POSSIBLE EMBODIMENTS

The following are non-exclusive descriptions of possible embodiments of the present invention.

A method of making an additively manufactured ejector pump according to an exemplary embodiment of this disclosure, among other possible things includes: creating a computer file defining the ejector pump in layers, the ejector pump comprising: a duct extending along a centerline from an upstream end to a downstream end; a nozzle extending inward from the duct including a flow path therein; an annulus connected to the duct including a cavity therein; and at least one of the first group consisting of: a first gusset extending between the duct and the nozzle on a nozzle downstream side; wherein the flow path comprises a cross-section with a flow path shape of a semicircle on a nozzle upstream side and a peaked shape on the nozzle downstream side; and wherein the cavity comprises a cross-section with a cavity shape of quadrant of a circle on an annulus upstream side and a slant on an annulus downstream side; and building the ejector pump using an additive manufacturing process that builds the ejector on a layer-by-layer basis from the upstream end to the downstream end such that there are no temporary support structures associated with the at least one of the group.

The method of the preceding paragraph can optionally include, additionally and/or alternatively, any one or more of the following features, configurations and/or additional components:

A further embodiment of the foregoing method, wherein the ejector pump can comprise at least two of the first group.

A further embodiment of any of the foregoing methods, wherein the ejector pump can comprise all three of the first group.

A further embodiment of any of the foregoing methods, wherein the ejector pump can further comprise: a platform connected to the duct; and a flange at the downstream end of the duct; and at least one of the second group consisting of: a second gusset extending between the duct and the platform on a platform upstream side; and wherein the flange extends from the duct at angle of about fifty degrees or less with respect to the centerline.

A further embodiment of any of the foregoing methods, wherein the ejector pump can comprise at least two of the first group.

A further embodiment of any of the foregoing methods, wherein the ejector pump can comprise all three of the first group.

A further embodiment of any of the foregoing methods, wherein the ejector pump can comprise both of the second group.

A further embodiment of any of the foregoing methods, wherein the ejector pump can comprise at least two of the first group.

A further embodiment of any of the foregoing methods, wherein the ejector pump can comprise all three of the first group.

A further embodiment of any of the foregoing methods, wherein the annulus can be connected to a duct exterior.

A monolithic ejector pump having an upstream end and a downstream end according to an exemplary embodiment of this disclosure, among other possible things includes: a duct extending along a centerline from an upstream end to a downstream end, a nozzle extending inward from the duct including a flow path therein, and an annulus connected to the duct including a cavity therein; the ejector pump being made by the steps of: selectively sintering a first layer of pulverulent material within a frame to make an initial layer of the upstream end of a partially built ejector pump; lowering the partially built ejector pump; adding a second layer of pulverulent material on top of the partially built ejector pump; and selectively sintering the second layer of pulverulent material to the partially built ejector pump.

The ejector pump of the preceding paragraph can optionally include, additionally and/or alternatively, any one or more of the following features, configurations and/or additional components:

A further embodiment of the foregoing ejector pump, wherein the ejector pump can further comprise at least one of the first group consisting of: a first gusset extending between the duct and the nozzle on a nozzle downstream side; wherein the flow path comprises a cross-section with a flow path shape of a semicircle on a nozzle upstream side and a peaked shape on the nozzle downstream side; and wherein the cavity comprises a cross-section with a cavity shape of quadrant of a circle on an annulus upstream side and a slant on an annulus downstream side.

A further embodiment of any of the foregoing ejector pumps, wherein a first gusset layer can be made before a first nozzle layer is made.

A further embodiment of any of the foregoing ejector pumps, wherein the ejector pump can further comprise at least two of the first group.

A further embodiment of any of the foregoing ejector pumps, wherein the ejector pump an further comprise: a platform connected to the duct; and a flange at the downstream end of the duct.

A further embodiment of any of the foregoing ejector pumps, wherein the ejector pump can further comprise at least one of the second group consisting of: a second gusset extending between the duct and the platform on a platform upstream side; and wherein the flange extends from the duct at angle of about fifty degrees or less with respect to the centerline.

An ejector pump according to an exemplary embodiment of this disclosure, among other possible things includes: a duct extending along a centerline from an upstream end to a downstream end; a nozzle extending inward from the duct including a flow path therein; an annulus connected to the duct including a cavity therein; at least one of the first group consisting of: a first gusset extending between the duct and the nozzle on a nozzle downstream side; wherein the flow path comprises a cross-section with a flow path shape of a semicircle on a nozzle upstream side and a peaked shape on the nozzle downstream side; and wherein the cavity comprises a cross-section with a cavity shape of quadrant of a circle on an annulus upstream side and a slant on an annulus downstream side.

The ejector pump of the preceding paragraph can optionally include, additionally and/or alternatively, any one or more of the following features, configurations and/or additional components:

A further embodiment of the foregoing ejector pump, wherein the ejector pump can further comprise: a platform connected to the duct; and a second gusset extending between the duct and the platform on a platform upstream side.

A further embodiment of any of the foregoing ejector pumps, wherein the ejector pump can further comprise: a flange at the downstream end of the duct, wherein the flange extends from the duct at angle of about fifty degrees or less with respect to the centerline.

A further embodiment of any of the foregoing ejector pumps, wherein the annulus can be connected to a duct exterior.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method of making an additively manufactured ejector pump, the method comprising:
   creating a computer file defining the ejector pump in layers, the ejector pump comprising:
      a duct extending along a centerline from an upstream end to a downstream end;
      a nozzle extending inward from the duct including a flow path therein;
      an annulus connected to the duct and including a cavity therein;
      a first gusset extending between the duct and the nozzle on a nozzle upstream side;
      wherein the flow path comprises a cross-section with a flow path shape of a semicircle on the nozzle upstream side and a peaked shape on a nozzle downstream side, wherein the peaked shape on the nozzle downstream side includes first and second legs each of which extend at an angle of fifty degrees or less with respect to the centerline; and
      wherein the cavity comprises a cross-section with a shape of a quadrant of a circle on an annulus upstream side and a slant on an annulus downstream side; and
   building the ejector pump using a layer-by-layer additive manufacturing process, wherein the layer-by-layer additive manufacturing process comprises:
      building the ejector pump from the upstream end to the downstream end such that there are no temporary support structures associated with the first gusset, the flow path, or the cavity during the layer-by-layer additive manufacturing process;
      forming, with layer-by-layer additive manufacturing, a platform connected to the duct;
      forming, with layer-by-layer additive manufacturing, a flange at the downstream end of the duct, wherein the flange extends from the duct at an angle of about fifty degrees or less with respect to the centerline, wherein the platform and the flange are formed such that there are no temporary support structures associated with the platform or the flange; and
      forming, with layer-by-layer additive manufacturing, a second gusset extending between the duct and the platform on a platform upstream side.

2. The method of claim 1, wherein the annulus is connected to a duct exterior.

3. A monolithic ejector pump having an upstream end and a downstream end, the ejector pump comprising: a duct extending along a centerline from the upstream end to the downstream end; a nozzle extending inward from the duct, wherein the nozzle includes a flow path therein; an annulus connected to the duct and including a cavity therein; a first gusset extending between the duct and the nozzle on a nozzle upstream side; wherein the flow path comprises a cross-section with a flow path shape of a semicircle on the nozzle upstream side and a peaked shape on a nozzle downstream side, wherein the peaked shape on the nozzle downstream side includes first and second legs each of which extend at an angle of fifty degrees or less with respect to the centerline; wherein the cavity comprises a cross-section with a shape of a quadrant of a circle on an annulus upstream side and a slant on an annulus downstream side; and wherein the ejector pump is built with layer-by-layer additive manufacturing comprising the steps of: selectively sintering a first layer of pulverulent material within a frame to make an initial layer of the upstream end of the ejector pump; lowering the ejector pump; adding a second layer of pulverulent material on top of the ejector pump; selectively sintering the second layer of pulverulent material to the ejector pump; and building the ejector pump from the upstream end to the downstream end such that there are no temporary support structures associated with the first gusset, the flow path, or the cavity during the layer-by-layer additive manufacturing.

4. The ejector pump of claim 3, wherein a first gusset layer is made before a first nozzle layer is made.

5. The ejector pump of claim 3, wherein the ejector pump further comprises:
- a platform connected to the duct; and
- a flange at the downstream end of the duct.

6. The ejector pump of claim 5, further comprising:
- a second gusset extending between the duct and the platform on a platform upstream side; and
- wherein the flange extends from the duct at angle of about fifty degrees or less with respect to the centerline.

* * * * *